US012225301B2

(12) United States Patent
Hwang et al.

(10) Patent No.: US 12,225,301 B2
(45) Date of Patent: Feb. 11, 2025

(54) SYSTEMS AND METHODS FOR PIXEL ON-OFF SWITCHING IN FOCAL PLANE ARRAYS

(71) Applicant: LG INNOTEK CO., LTD., Seoul (KR)

(72) Inventors: Harold Hwang, Cranbury, NJ (US); Matthew T. O'Grady, Newtown, PA (US); Brian Edward Piccione, Yardley, PA (US); Mark Itzler, Princeton, NJ (US)

(73) Assignee: LG INNOTEK CO., LTD., Seoul (KR)

( * ) Notice: Subject to any disclaimer, the term of this patent is extended or adjusted under 35 U.S.C. 154(b) by 303 days.

(21) Appl. No.: 17/833,681

(22) Filed: Jun. 6, 2022

(65) Prior Publication Data

US 2023/0396893 A1    Dec. 7, 2023

(51) Int. Cl.
*H04N 25/42*    (2023.01)
*G01S 17/931*    (2020.01)
(Continued)

(52) U.S. Cl.
CPC ........... *H04N 25/42* (2023.01); *G01S 17/931* (2020.01); *H04N 25/60* (2023.01); *H04N 25/709* (2023.01); *H04N 25/767* (2023.01)

(58) Field of Classification Search
CPC ...... H04N 25/42; H04N 25/60; H04N 25/709; H04N 25/767; H04N 25/68; H04N 25/773;
(Continued)

(56) References Cited

U.S. PATENT DOCUMENTS 5,723,866 A    3/1998    Hamilton
6,593,562 B1*    7/2003    Parrish .............. H01L 27/14609
                                    348/246
(Continued)

FOREIGN PATENT DOCUMENTS

WO    WO 2014/105897 A1    7/2014
WO    WO 2015/021074 A1    2/2015

OTHER PUBLICATIONS

Arounassalame et al., "Robust Evaluation of Long-Term Stability of an InAs/GaSb Type II Superlattice Midwave Infrared Focal Plane Array," IEEE Transactions on Instrumentation and Measurement, Institute of Electrical and Electronics Engineers, 2021, 70, pp. 5001108, 10.1109/TIM.2020.3024406, hal-03042939; 9 pages.
(Continued)

*Primary Examiner* — Seung C Sohn
(74) *Attorney, Agent, or Firm* — Birch, Stewart, Kolasch & Birch, LLP

(57) ABSTRACT

Systems and methods are described for optical processing. According to some aspects an optical processing apparatus may include a pixelated photodiode array (PDA), each pixel in the PDA includes a radiation detector. The apparatus also includes a read out integrated circuit (ROIC) that includes a logic circuit and a plurality of switch elements. The plurality of switch elements being switchable between an armed state for arming its corresponding radiation detector and transmitting a signal received from the corresponding detector to the ROIC, and a disarmed state for disarming its corresponding detector and blocking transmittal of the signal, wherein in the armed state, the PDA is configured to detect an incoming optical signal and in the disarmed state, the PDA is configured to disregard the incoming optical signal. Moreover, the logic circuit controls a switch state of a selectable switch element associated with a radiation detector.

16 Claims, 7 Drawing Sheets

(51) Int. Cl.
*H04N 25/60* (2023.01)
*H04N 25/709* (2023.01)
*H04N 25/767* (2023.01)

(58) Field of Classification Search
CPC ..... H04N 25/40; G01S 17/931; G01S 7/4813; G01S 7/4815; G01S 7/4816; G01S 17/86
See application file for complete search history.

(56) References Cited

U.S. PATENT DOCUMENTS

| | | | |
|---|---|---|---|
| 6,660,988 B2 * | 12/2003 | Lee | ............ H01L 27/14627 |
| | | | 257/E27.131 |
| 6,953,932 B2 | 10/2005 | Anderson et al. | |
| 7,417,230 B2 | 8/2008 | Anderson et al. | |
| 7,491,920 B2 | 2/2009 | Lee et al. | |
| 7,916,191 B2 | 3/2011 | Kiba et al. | |
| 8,445,838 B1 | 5/2013 | Bixler et al. | |
| 9,530,820 B1 | 12/2016 | Douglas et al. | |
| 9,793,177 B2 | 10/2017 | Bender | |
| 9,911,030 B1 | 3/2018 | Zhu et al. | |
| 10,267,908 B2 | 4/2019 | Luders et al. | |
| 10,268,203 B2 | 4/2019 | Wisniowski | |
| 10,345,437 B1 | 7/2019 | Russell et al. | |
| 2015/0177394 A1 * | 6/2015 | Dolinsky | ............ G01T 1/208 |
| | | | 250/252.1 |
| 2017/0328729 A1 | 11/2017 | Zhu et al. | |
| 2018/0231654 A1 | 8/2018 | Bilik et al. | |
| 2018/0284268 A1 | 10/2018 | McWhirter | |
| 2019/0018416 A1 | 1/2019 | Gassend | |
| 2020/0379465 A1 | 12/2020 | Adam et al. | |

OTHER PUBLICATIONS

Bender et al., "Precision Laser Annealing of Silicon devices for Enhanced Electro-Optic Performance," Proceedings of SPIE—The International Society for Optical Engineering, 2014, 8967. 10.1117/12.2037339; 8 pages.

Santos et al., "Non-uniformity correction in a Long Wave Infrared Focal Plane Array as a calibration temperature function," 2018 33rd Symposium on Microelectronics Technology and Devices (SBMicro), 2018, pp. 1-5, doi: 0.1109/SBMicro.2018.8511611; 6 pages.

* cited by examiner

SYSTEMS AND METHODS FOR PIXEL ON-OFF SWITCHING IN FOCAL PLANE ARRAYS

FIELD

The present disclosure relates generally to operations of focal plane arrays (FPAs). More particularly, the present disclosure relates to implementing systems and methods for improving performance of FPAs with non-functional units that can heavily affect overall performance and production yield.

BACKGROUND

Modern day vehicles can be configured to operate in an autonomous mode in which the vehicle navigates through an environment with little or no input from a driver. Such autonomous vehicles can include one or more sensors that detect information about the environment in which the vehicle operates. The autonomous vehicle (AV) and its associated computer-implemented controller use the detected information to navigate through the environment. For example, if the sensors detect that the AV is approaching an obstacle, as determined by the computer-implemented controller, the controller adjusts the AV's directional controls to cause the AV to navigate around the obstacle. Accordingly, autonomous navigation depends heavily on vehicle sensors to accurately detect, and map out environmental conditions encountered by the AV. One such sensor is a light detection and ranging (lidar) device. A lidar device actively estimates distances to environmental features while scanning through a scene to assemble a cloud of point positions indicative of the three-dimensional shape of the environmental scene. Individual points are measured by generating a laser pulse and detecting a returning pulse, if any, reflected from an environmental object, and determining the distance to the reflective object according to the time delay between the emitted pulse and the reception of the reflected pulse. Other sensors may include infrared (IR) sensors, and other imaging sensors (e.g., focal plane arrays (FPAs)) that provide data points to enable autonomous navigation.

FPAs are image sensors consisting of arrays of light-sensing elements (e.g., pixels) at a focal plane of a lens. FPAs may be used for imaging purposes (e.g., taking pictures or video imagery) as well as non-imaging purposes such as spectrometry, wave-front sensing, lidar and other sensor applications.

Limitations in semiconductor device fabrication (e.g., III-V semiconductor devices such as FPAs) often results in some non-performant devices on a fabricated wafer. When the device consists of many identical units (e.g., pixels in an FPA), the non-performant units can heavily affect the yield on a given wafer and overall performance of the sensor. For example, a typical FPA may consist of a photodiode array (PDA) and a readout integrated circuit (ROIC). In some aspects, the ROIC controls arming and disarming of the PDA. In current FPA designs, a ROIC arming bias is applied to all pixels of the FPA, including noisy pixels that have poor performance and may degrade the performance of other nearby pixels. Accordingly, improving the performance of FPAs with non-functional units (e.g., non-functional pixels) will be vital for the operation of FPAs, thereby improving detection capabilities of the respective sensors and the autonomous navigation of the AV. The present systems and methods of this disclosure address the aforementioned problems.

SUMMARY

Disclosed herein, in accordance with aspects, are systems and methods for selectively controlling arming and disarming operations in pixelated photodiode arrays (PDAs). According to some aspects there is disclosed an apparatus (e.g., optical processing apparatus), the apparatus includes a PDA, wherein each pixel in the PDA includes a radiation detector. According to some aspects, the apparatus further includes a read out integrated circuit (ROIC) that includes: a plurality of switch elements each being connected to a respective radiation detector of each pixel, each switch element of the plurality of switch elements being switchable between an armed state for arming its corresponding radiation detector and receiving an output signal from its corresponding detector, and a disarmed state for disarming its corresponding radiation detector and blocking the output signal, wherein in the armed state, the PDA is configured to detect an incoming optical signal and in the disarmed state, the PDA is configured to disregard the incoming optical signal. The ROIC also includes a logic circuit configured to control a switch state of each switch element of the plurality of switch elements.

According to some aspects, there is disclosed a method including receiving an optical signal at a pixelated photodiode array (PDA), arming, by a logic circuit, a radiation detector of a pixel of the PDA by controlling a selectable switch element of a read out integrated circuit (ROIC) connected to the PDA to power the radiation detector and transmit a received output signal of the radiation detector; and disarming, by the logic circuit, the radiation detector of the pixel of the PDA by controlling the selectable switch element to disconnect the radiation detector from power and to block the radiation detector from outputting the signal.

According to some aspects, there is disclosed A read out integrated circuit (ROIC) comprising a plurality of switch elements connected to a respective radiation detector of a pixelated photodiode array (PDA), each switch element of the plurality of switch elements being switchable between an armed state for arming its corresponding radiation detector and transmitting a signal received from the corresponding detector to the ROIC, and a disarmed state for disarming its corresponding radiation detector and blocking transmittal of the signal, wherein in the armed state, the PDA is configured to detect an incoming optical signal, and in the disarmed state, the PDA is configured to disregard the incoming optical signal; and a logic circuit configured to control a switch state of each switch element of the plurality of switch elements.an optical processing apparatus including a read out integrated circuit (ROIC).

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
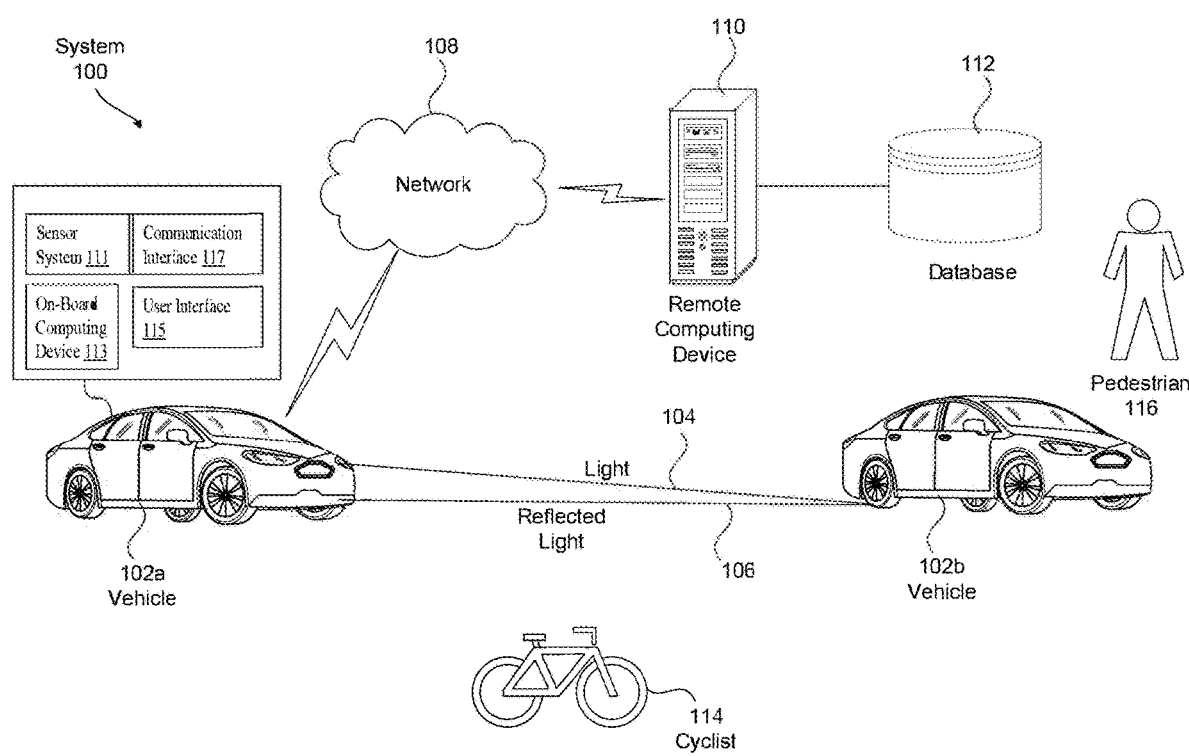
FIG. 1 illustrates an exemplary autonomous vehicle system, in accordance with aspects of the disclosure.

The development and mass production of autonomous vehicles (AVs) has the potential to revolutionize transportation mobility and safety. AVs combine a variety of sensors to perceive their surroundings, such as radar, lidar, sonar, GPS, odometry and inertial measurement devices. In some aspects, advanced control systems may interpret sensory information to identify appropriate navigation paths, as well as detect obstacles and relevant signage.

One key sensor that AVs rely on is lidar, which relies on systems and methods for determining ranges by targeting an object with a laser and measuring the time for the reflected light to return to the receiver. According to some aspects, lidar may be used to make digital 3-D representations of areas of a perception region (e.g., an area surrounding the AV). Within the 3-D representations (also known as lidar grids), a lidar computing system, or an on-board computing device (such as computing device 220 discussed herein below) may detect a moving object within the perception region, may generate one or more possible object trajectories for the detected object and the AV, and may analyze the possible object trajectories to assess the probability of a collision between the object and the AV. The performance and accuracy of the sensor system, including the lidar, enables an AV to successfully navigate a route irrespective of the obstacles. To this end, the hardware components making up a sensor like lidar need to operate at optimum performance.

Manufacturing sensors, such as lidar, can include acceptable tolerance of non-performant parts. For example, limitations in semiconductor device fabrication (e.g., III-V semiconductor devices such as FPAs) often results in some non-performant devices on a fabricated wafer. In other words, a manufactured FPA may include a number of non-performant pixels that may affect the overall performance of the FPA, and thereby, the overall performance of the sensor, e.g., lidar, and the autonomous navigation operation.

When manufacturing FPAs, a manufacturer may discover a number of FPAs have a high level of non-performant elements (e.g., noisy, leaky, or non-functioning pixels) that may degrade the performance of the FPA. Typically, such discovery leads a manufacturer to either discard such FPA (thereby significantly reducing the yield of production), or deploying the FPAs within the field (thereby leading to reduced detection accuracy and sub optimal sensor performance). To address these concerns, the present disclosure provides for systems and methods that selectively turn on and turn off non-performing elements. It can be appreciated that such systems may be deployed during a manufacturing process, e.g., during testing, and also in the field, e.g., during operation.

According to aspects of the present disclosure, systems and methods are provided for improved detection of objects by selectively managing the arming and disarming operations on a per-pixel level of an FPA. This enables the system to temporarily or permanently disable a non-performing pixel that can adversely affect and degrade the performance of other nearby pixels. The benefits provided by the embodiments discussed herein decrease processing time and bandwidth and can further enable on-board computing device 220 to generate faster object trajectories. This is especially important for AVs operating in the field, where faster and more accurate detection and decision-making capabilities (due to decreased processing time and bandwidth) can help an AV generate and execute faster navigation-based decisions, thereby resulting in improved operation of the AV. As also noted herein, the reduction of processing time and bandwidth also improves power consumption, thereby increasing a total range of a battery-operated AV for example.

It can be appreciated that the techniques described herein provide several benefits over existing systems. For example, existing systems provide global biasing of all the PDA pixels to the same armed state. In this case, non-performing pixels (e.g., noisy pixels) generate spurious electrical noise that can degrade the performance of nearby pixels that would otherwise perform normally. The ability to selectively disable noisy pixels, as described in the present disclosure, provides higher performing FPAs and also leads to higher FPA module yield for manufacturers. In some aspects, the selective disabling of noisy pixels may be done at a testing phase during module assembly or in the field. As will be further described herein, the disclosure also provides for fuse circuitry that can allow noisy pixels to be selectively disconnected from direct current (DC) biasing. This provides for corrective measures of FPAs that develop non-performing pixels while deployed in operation. For example, where an FPA is deployed in an AV and performance degradation is detected, noisy pixels may be selectively and permanently disconnected from DC bias so as to not provide any leakage current and/or noise signals. Such performance improvements provide benefits for manufacturers and system integrators alike. For example, a manufacturer can produce a higher FPA module yield by leveraging the selective biasing techniques described herein (rather than discarding the FPAs). Moreover, system integrators that integrate the FPAs in the field, e.g., in lidar systems or other sensors, can extract higher performance from each deployed FPA by also leveraging the selective biasing techniques to suppress spurious data produced by noisy pixels. This, in turn, leads to improved detection capabilities of the sensor (e.g., lidar), leading to improved autonomous navigation with regard to speed, accuracy and safety.

The following may be an example description of a solution (autonomous vehicle and associated sensors) incorporating the systems and methodologies described herein. It can be appreciated by those skilled in the art that such an example is not limiting, and other applications within other sensors and solutions may also be deployed.

According to some aspects, the term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones, and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Notably, the present solution is being described herein in the context of an autonomous vehicle. However, the present solution is not limited to autonomous vehicle applications. The present solution may be used in other applications such as robotic applications, radar system applications, metric applications, and/or system performance applications. It can be appreciated that the embodiments used herein describe aspects of the present solution. It can also be appreciated that all embodiments are exemplary and can be combined with other embodiments.

FIG. 1 illustrates an exemplary autonomous vehicle system 100, in accordance with aspects of the disclosure. System 100 comprises a vehicle 102a that is traveling along a road in a semi-autonomous or autonomous manner. Vehicle 102a is also referred to herein as autonomous vehicle (AV) 102a. AV 102a can include, but is not limited to, a land vehicle (as shown in FIG. 1), an aircraft, or a watercraft.

AV 102a is generally configured to detect objects 102b, 114, and 116 in proximity thereto. The objects can include, but are not limited to, a vehicle 102b, cyclist 114 (such as a rider of a bicycle, electric scooter, motorcycle, or the like) and/or a pedestrian 116. When such a detection is made, AV 102a performs operations to generate one or more possible object trajectories for the detected object and analyze at least one of the generated possible object trajectories to determine whether or not there is an undesirable level of probability that a collision will occur between the AV and object in a threshold period of time (e.g., 1 minute). This may also be referred to as collision probability assessment hereinafter. If so, the AV 102a performs operations to determine whether the collision can be avoided if a given vehicle trajectory is followed by the AV 102a and any one of a plurality of dynamically generated emergency maneuvers is performed in pre-defined time period (e.g., N milliseconds). If the collision can be avoided, then the AV 102a takes no action or optionally performs a cautious maneuver (e.g., mildly slows down). In contrast, if the collision cannot be avoided, then the AV 102a immediately takes an emergency maneuver (e.g., brakes and/or changes direction of travel). Other approaches to collision detection and avoidance by AV 102a are contemplated by this disclosure as would be understood by one skilled in the relevant art.

As will be described in greater detail in association with FIG. 3, AV 102a may be configured with a lidar system 300. Lidar system 300 may include a light emitter system 304 (transmitter) that transmits a light pulse 104 to detect objects located within a distance or range of distances of AV 102a. Light pulse 104 may be incident on one or more objects (e.g., AV 102b) and be reflected back to lidar system 300. Reflected light pulse 106 incident on light detector 308 is processed by lidar system 300 to determine a distance of that object to AV 102a. Light detector 308 may, in some embodiments, contain a photodetector or array of photodetectors positioned and configured to receive the light reflected back into the system. For example, light detector 308 may contain a focal plane array including a photodiode array (PDA) and a readout integrated circuit (ROIC). According to some aspects, each pixel of the PDA may be electrically connected to a dedicated channel of the ROIC such that the ROIC controls the arming and disarming of individual PDA pixels through via an ON/OFF switch as will be further described herein. According to some aspects, the PDA may contain Geiger-mode avalanche photodiodes (GmAPD), which are capable of detecting single photon levels.

In some aspects, silicon photodiodes convert light into an electrical signal. This conversion occurs when photons having more energy than the bandgap of the detector material are absorbed, exciting an electron from the valence band of the semiconductor to the conduction band, where it is read out as signal. GmAPDs use the same process, but they generate internal gain using an avalanche multiplication process. An avalanche region is produced within the APD, creating an area of very high electric-field strength. When a photogenerated (or thermally generated) electron in the conduction band moves into the avalanche region, the electric-field strength is sufficient to accelerate it to the point at which it can cause "impact ionization" and liberate another electron. Both of these electrons can be accelerated as well, creating an avalanche multiplication. This process results in detector gain. Typical gains for an APD are in the range of ten to a few hundred.

Geiger-mode operation can increase the modest gain of an APD to a more significant level. The gain of an APD increases with stronger internal electric field but remains finite up to a threshold breakdown electric field Eb established by a corresponding externally applied breakdown voltage $V_b$. For applied voltages less than $V_b$, the output photocurrent of the APD is proportional to the input optical intensity, and device operation below the breakdown voltage is referred to as "linear mode". In contrast, applied voltages greater than $V_b$ lead to a finite probability that a single carrier injected into the avalanche region will trigger a self-sustaining avalanche characterized by divergent (i.e., infinite) gain. This rapid generation of easily measured avalanche currents triggered by just a single photoexcited carrier allows for the efficient detection of single photons. In practical operation, the self-sustaining Geiger-mode avalanches are quenched once they are detected. In this case, one refers to an effective gain given by the number of charges (typically $>>10^5$) that flow in response to the injection of just a single electron into the avalanche region.

In some aspects, the quenching and reset of the GmAPD can be accomplished passively by placing a sufficiently large resistor in series with the detector. A fixed bias voltage is applied across the series combination of the GmAPD and the resistor. When no current is flowing, the entire bias is dropped across the GmAPD, and it is in its "armed" state. When the junction breaks down, a large current flows through the resistor, and the resulting voltage drop across the resistor reduces the voltage across the GmAPD, allowing the avalanche process to passively quench into the "disarmed" state. In other cases, when avalanche breakdown is detected, the bias voltage is actively reduced below the breakdown voltage and the GmAPD avalanche is actively quenched. Following either type of quenching to the "disarmed" state, the bias voltage across the GmAPD is then reset to a value above the breakdown voltage so that it is again armed to make subsequent detections. The discharge-and-reset cycle is known as the Geiger mode of operation. These operations may be further explained herein with reference to FIGS. 4-6.

Figure 4:
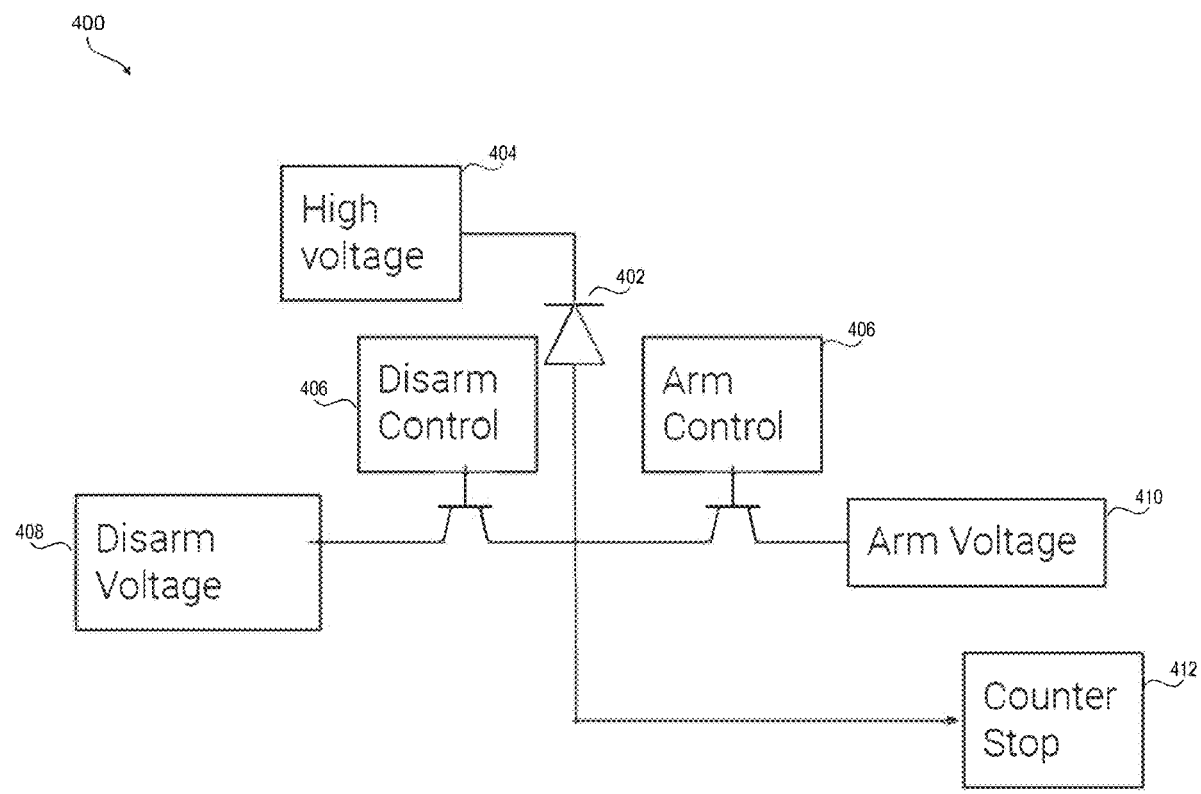
FIG. 4 illustrates an exemplary schematic switch architecture of a pixel ON/OFF switch, in accordance with aspects of the disclosure.
Figure 5:
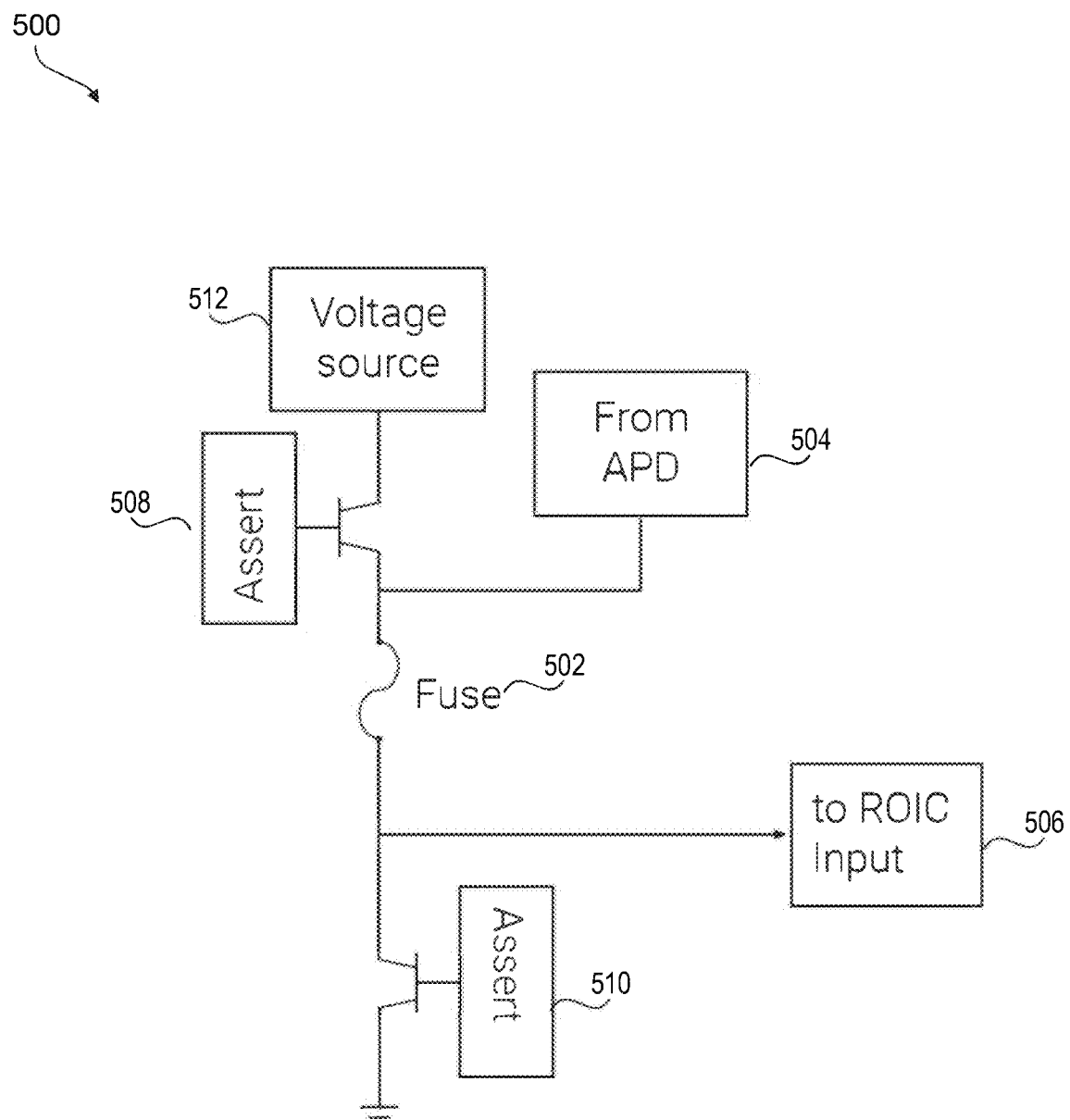
FIG. 5 illustrates a fuse assembly, in accordance with aspects of the disclosure.
Figure 6:
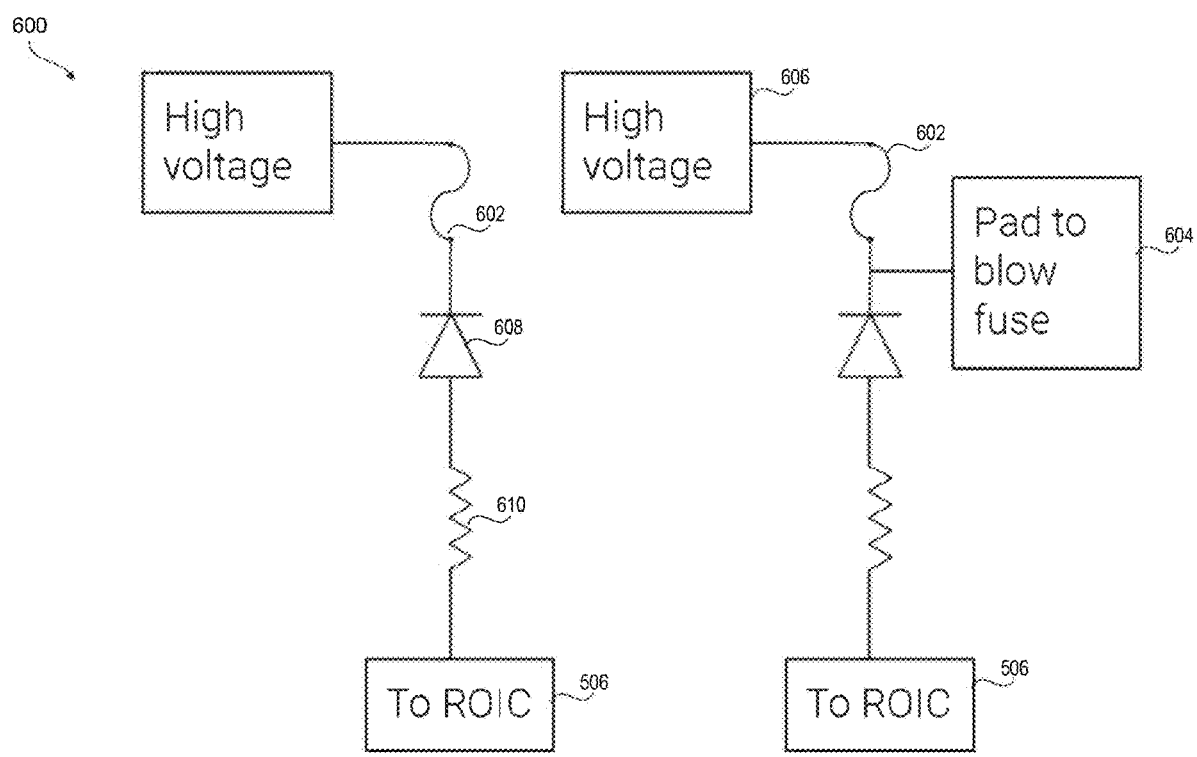
FIG. 6 illustrates a fuse assembly, in accordance with aspects of the disclosure.

As will be further discussed with regard to FIG. 4, aspects of the disclosure aim to selectively turn pixels in an FPA off so that the FPA can still perform a needed function while operating, without all its pixels being operational. For FPA's using GmAPDs, the PDA may be armed and disarmed by manipulating a net applied reverse voltage in relation to a GmAPD breakdown voltage. For example, a PDA may be armed when the net applied reverse voltage is above a breakdown voltage of the GmAPD. Similarly, a PDA may be disarmed when the net applied reverse voltage is below the GmAPD breakdown voltage. It can be appreciated that by increasing the reverse voltage to a bias above the breakdown voltage, the PDA is considered armed. According to some aspects, a total voltage on the PDA may be the sum of a fixed negative DC bias voltage (Vdc) and an additional arming bias applied by the ROIC. For example, for an arming bias in which an arming transistor switches between +5V and 0V (ground), the (negative) sum (e.g., Vdc+5V) leaves the PDA in the disarmed state. In other words, instead of arming the entire PDA, the present disclosure enables the selective disarming of non-performing pixels such that their behavior (when biased above the breakdown voltage) does not impede the performance of neighboring pixels. This selective disarming may be performed through a switch, as described in FIG. 4. In some instances, whether during testing or in the field of operation (e.g., within an operating sensor like a lidar sensor), a disarmed pixel may still produce sufficient leakage current that may degrade the performance of nearby pixels. In such instances, a fuse may be activated that can permanently disarm the non-functional pixel. The fuse implementation is illustrated in FIGS. 5 and 6 respectively.

Figure 2:
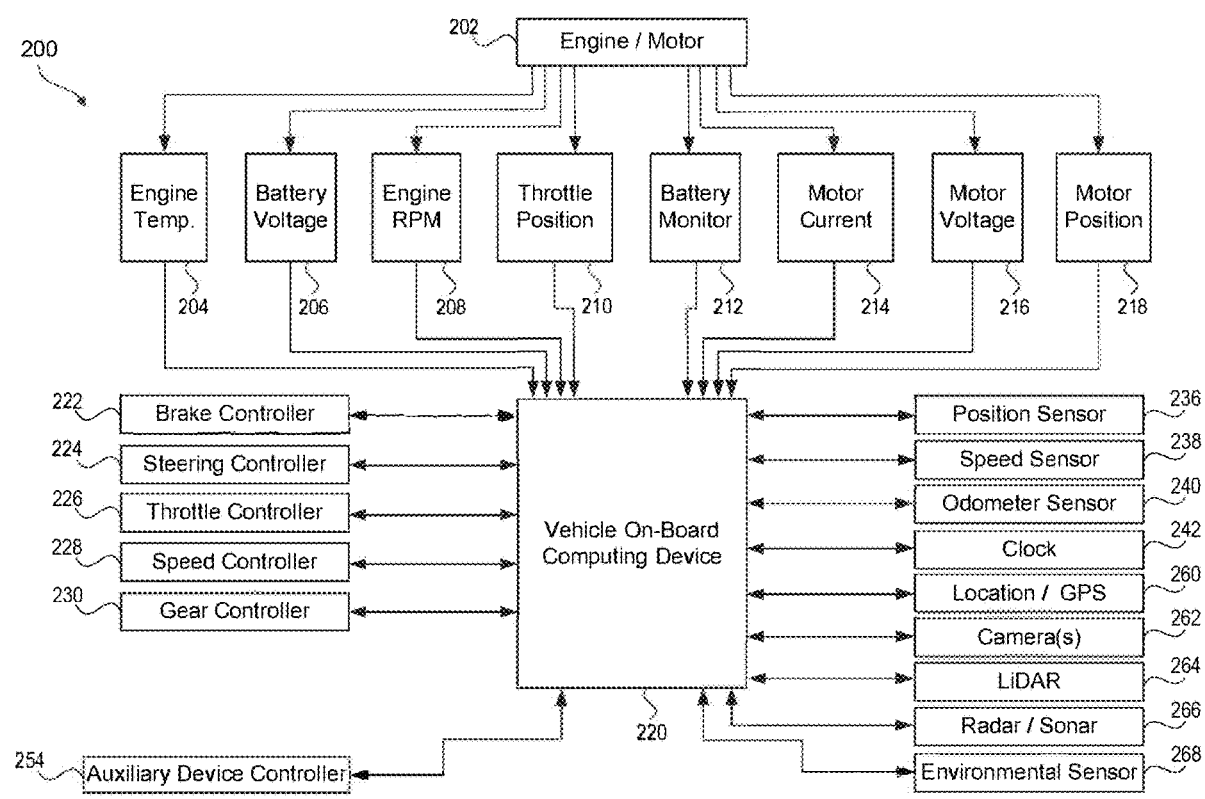
FIG. 2 illustrates an exemplary architecture for a vehicle, in accordance with aspects of the disclosure.

Continuing with FIG. 1, lidar information, such as detected object data, is communicated from lidar system 300 to an on-board computing device 220 (FIG. 2). AV 102a may also communicate lidar data to a remote computing device 110 (e.g., cloud processing system) over communications network 108. Remote computing device 110 may be configured with one or more servers to process one or more processes of the technology described herein. Remote computing device 110 may also be configured to communicate data/instructions to/from AV 102a over network 108, to/from server(s) and/or database(s) 112.

Network 108 may include one or more wired or wireless networks. For example, the network 108 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102a may retrieve, receive, display, and edit information generated from a local application or delivered via network 108 from database 112. Database 112 may be configured to store and supply raw data, indexed data, structured data, map data, program instructions or other configurations as is known.

FIG. 2 illustrates an exemplary system architecture 200 for a vehicle, in accordance with aspects of the disclosure. Vehicles 102a and/or 102b of FIG. 1 can have the same or similar system architecture as that shown in FIG. 2. Thus, the following discussion of system architecture 200 is sufficient for understanding vehicle(s) 102a and/or 102b of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also includes various sensors that operate to gather information about the environment in which the vehicle is traveling and to detect objects. These sensors may include, for example: a location sensor 260 (e.g., a Global Positioning System ("GPS") device); one or more cameras 262; a lidar system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to a vehicle on-board computing device 220. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the vehicle on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar 264 is communicated (from those sensors) to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document.

Lidar information, as captured by detector 308 for example, is communicated from lidar system 264 to the on-board computing device 220. Additionally, captured images are communicated from the camera(s) 262 to the vehicle on-board computing device 220. The lidar information and/or captured images are processed by the vehicle on-board computing device 220 to detect objects in proximity to the vehicle 200. The manner in which the object detections are made by the vehicle on-board computing device 220 includes such capabilities detailed in this disclosure.

As can be appreciated by those skilled in the art, improving the detecting capabilities of lidar system 264, and more specifically, detector 308, the vehicle on-board computing device 220 can receive more accurate detections and generate more accurate object tracking and trajectories for detected objects. This leads to improved autonomous navigation because at least one sensor in the vehicle sensor suit is providing improved and more accurate detection information. Such improvements provide for more downstream benefits. For example, processing more accurate information can lead the vehicle on-board computing device 220 to perform analysis and provide solutions on a faster rate because less computing bandwidth may be spent on checking sensor accuracy data.

Figure 3:
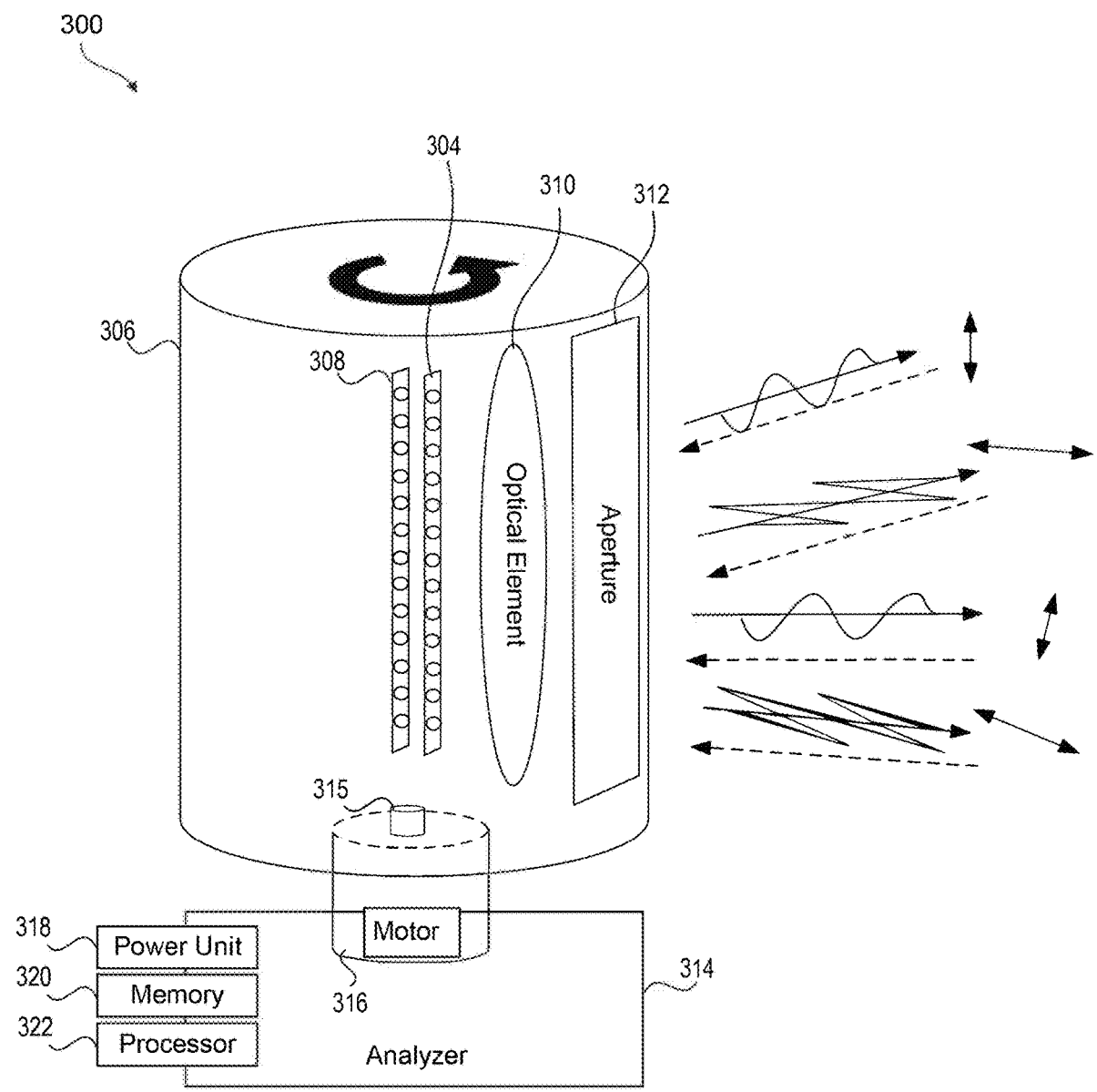
FIG. 3 illustrates an exemplary architecture for a lidar system, in accordance with aspects of the disclosure.

FIG. 3 illustrates an exemplary architecture for a lidar system 300, in accordance with aspects of the disclosure. In some aspects, lidar system 264 of FIG. 2 may be the same as or substantially similar to the lidar system 300. As such, the discussion of lidar system 300 is sufficient for understanding lidar system 264 of FIG. 2.

As shown in FIG. 3, the lidar system 300 includes a housing 306 which may be rotatable 360° about a central axis such as hub or axle 315 of motor 316. The housing may include an emitter/receiver aperture 312 made of a material transparent to light. Although a single aperture is shown in FIG. 3, the present solution is not limited in this regard. In other scenarios, multiple apertures for emitting and/or receiving light may be provided. Either way, the lidar system 300 can emit light through one or more of the aperture(s) 312 and receive reflected light back toward one or more of the aperture(s) 212 as the housing 306 rotates around the internal components. In an alternative scenario, the outer shell of housing 306 may be a stationary dome, at least partially made of a material that is transparent to light, with rotatable components inside of the housing 306.

Inside the rotating shell or stationary dome is a light emitter system 304 that is configured and positioned to generate and emit pulses of light through the aperture 312 or through the transparent dome of the housing 306 via one or more laser emitter chips or other light emitting devices. The emitter system 304 may include any number of individual emitters (e.g., 8 emitters, 64 emitters, or 128 emitters). The emitters may emit light of substantially the same intensity or of varying intensities. The lidar system also includes a light detector 308 containing a photodetector or array of photodetectors (e.g., a focal plane array (FPA) including a photodiode array (PDA) and/or a Geiger mode PDA) positioned and configured to receive light reflected back into the system. In one example, the light emitter system 304 and light detector 308 would rotate with the rotating shell, or they would rotate inside the stationary dome of the housing 306. It can be appreciated that the mechanical lidar system described herein is but an example lidar system relied on by aspects of the present solution and that other examples of lidar systems, such as solid state lidar systems may also be implemented.

In some aspects, one or more optical element structures 310 may be positioned in front of the light emitter system 304 and/or the light detector 308 to serve as one or more lenses or waveplates that focus and direct light that is passed through the optical element structure 310.

One or more optical element structures 310 may be positioned in front of a mirror (not shown) to focus and direct light that is passed through the optical element structure 310 (e.g., such as in a focal plane array). As shown below, the system includes an optical element structure 310 positioned in front of a mirror and connected to the rotating elements of the system so that the optical element structure 310 rotates with the mirror. Alternatively, or in addition, the optical element structure 310 may include multiple such structures (for example lenses and/or waveplates). Optionally, multiple optical element structures 310 may be arranged in an array on or integral with the shell portion of the housing 306.

According to some aspects, lidar system 300 includes a power unit 318 to power the light emitting unit 304, a motor 316, and electronic components. Lidar system 300 also includes an analyzer 314 with elements such as a processor 322 and non-transitory computer-readable memory 320 containing programming instructions that are configured to enable the system to receive data collected by the light detector unit, analyze it to measure characteristics of the light received, and generate information that a connected system can use to make decisions about operating in an environment from which the data was collected. Optionally, the analyzer 314 may be integral with the lidar system 300 as shown, or some or all of it may be external to the lidar system and communicatively connected to the lidar system via a wired or wireless communication network or link.

According to some aspects, lidar system 300 may generate and provide an output to a vehicle on-board computing system (e.g., on board computing device 220). Such output may include a three-dimensional (3-D) mapping of a perception region (an area illuminated by lidar 264 or lidar 300. According to some aspects the three-dimensional mapping may also be referred to as the lidar grid, where grid cells may each provide a proportional representation of the perception region. When an object is detected within the lidar grid, on-board computing device 220 may attempt to generate a point cloud mapping (e.g., a lidar grid) including the detected object to then generate a collision threat assessment and potential navigation instructions to other AV systems. Accordingly, the systems and methods for improving the detection capabilities and performance of FPA are described herein with regard to FIGS. 4-7 below.

FIG. 4 illustrates an exemplary schematic switch architecture 400 including a pixel ON/OFF switch, according to some embodiments. Switch architecture 400 may include photodiode 402, high voltage source 404, arm/disarm control circuit 406, disarm voltage source 408, arm voltage source 410, and counter stop 412. According to some aspects, high voltage source 404 may be connected to a cathode of photodiode 402. Photodiode 402 may be a GmAPD photodiode. According to some aspects, arm/disarm control circuit 406 may be configured to dynamically raise a bias voltage (e.g., high voltage supply) to be above the breakdown voltage of photodiode 402. In one example, when an avalanche event occurs (e.g., when light is received), a disarm circuit quenches (i.e., stops) the avalanche current and a counter stop mechanism is triggered. Although not shown, arm/disarm control circuit 406 may also include a microprocessor, a central processing unit (CPU) and/or a logic circuit configured to process commands that enable the arm/disarm operations of the switch. In some aspects, to prevent the photodiode from being armed above its breakdown voltage, the arm/disarm control circuit 406 may not assert the arming control signal. Although not shown in the figure, switch architecture 400 may connect the output of photodiode 402 to a ROIC. According to some aspects, circuit elements connecting to the anode of the photodiode 402 may be part of a ROIC (e.g., elements 406, 408, 410, and 412).

It can be appreciated that the PDA may be a pixelated photodiode array where each pixel in the PDA includes a radiation detector such as photodiode 402. Moreover, while FIG. 4 illustrates a single switch architecture, it can be appreciated that the PDA interfaces to a plurality of switches each connected to a respective radiation detector (e.g., photodiode 402) to selectively arm and disarm a respective photodiode 402. As noted herein, selectively arming and disarming may depend on observed performance of each photodiode 402 in the PDA such that non-performing photodiodes may be selectively disarmed according to aspects of the disclosure. It can be appreciated that selectively arming and disarming may also depend on scenarios in which a user (e.g., a tester or an operator) would not want to arm a particular detector because the user is not interested in the data from the corresponding region of the scene being imaged.

As described herein, aspects of the disclosure provide for the disabling of non-performing pixels (e.g., noisy pixels/noisy photodiodes) by providing addressable pixel-level switches, such as switch assembly 400, that selectively prevent the noisy pixels from being armed during operation of the FPA. In this regard, arm/disarm circuit 406 may hold an arming transistor associated with the noisy pixel at its +5V rail and not allow the transistor to be pulled to ground. This action forces the associated PDA pixel to remain in the disarmed state. In other words, arm/disarm circuit 406 may be configured to maintain the noisy pixel in a disarmed state with a bias voltage of Vdc+5V by preventing the arming transistor from switching from +5V to 0V (ground). In this case, the noisy pixel remains at the disarm bias of Vdc+5V at all times. Accordingly, by applying a net reverse voltage value below the breakdown voltage of the GmAPD, switch assembly 400 prevents the noisy pixel from being armed during operation of the APD. To place a pixel in an armed state, switch assembly 400 may apply a net reverse voltage value above the breakdown voltage of photodiode 402.

It can be appreciated that the determination that a given pixel is non-performing may be made during a testing phase and a status of the non-performing pixel may be stored as part of a deselect map. In some aspects, the deselect map may indicate status of each pixel in the PDA and the type of fault that may be associated with each pixel, if any. For example, the deselect map may include a status associated with photodiode 402 indicating that the photodiode is non-performing. Moreover, the deselect map may also indicate that non-performing photodiode 402 is a noisy pixel. It can be appreciated that other non-performing status may be stored in the deselect map, including, but not limited to, observed dark current values above a predetermined dark current threshold, and/or observed leakage current level above a predetermined leakage current threshold value. Moreover, the deselect map may also list user preferences for disarming certain detectors as described herein.

According to some aspects, the switch architecture (e.g., switch architecture 400) may include a fuse element as described herein with reference to FIGS. 5 and 6. According to some aspects, the fuse element may be incorporated as an additional element within the switch architecture described in FIG. 4. It can be appreciated that in some instances, even in the disarmed state, the Vdc+5V bias may give rise to a leakage current that degrades the performance of nearby pixels. In other words, even if a noisy pixel is disarmed, the bias voltage may give rise to a leakage current that degrades the performance of nearby pixels. In this case, a fuse circuit may be incorporated in either the PDA or the ROIC to allow noisy pixels to be selectively disconnected from DC bias. According to some aspects, the combination of switch and fuse elements provides certain benefits. For example, using the switch element, operators may initially have a greater level of freedom when selecting and deselecting pixels/detectors. This provides for more robust testing practices and increases adaptability of the sensor and switch architecture. In cases where disarmed pixels may still affect the performance of other nearby pixels, the fuse element may be used to eliminate such effects permanently.

According to some aspects, the fuse element described herein may be incorporated as a substitute to the switch element. According to some aspects, solely using a fuse element may reduce complexities of the switch assembly and associated processing bandwidth.

Irrespective of whether the fuse element is solely implemented or is implemented in conjunction with the switch element, the following describes operations of the fuse element. According to some aspects, the fuse element may be blown, thereby permanently disconnecting a selectable pixel. According to some aspects, the blowing of the fuse may be programmable as a particular process step following initial testing of the FPA to identify leaky pixels. According to some aspects, the blowing of the fuse may be programmable as a particular step performed when a leaky pixel is identified in the field. This may occur where a pixel performance degrades over time and the pixel may become a noisy pixel and/or leakage current of disarmed pixels is observed over time in the field. To avoid replacement of an entire sensor assembly of an operational AV, the fuse circuit may be blown so that the associated PDA pixel is permanently/electrically disconnected from its corresponding ROIC channel as well as the DC bias circuit.

FIG. 5 illustrates a fuse assembly 500 according to some aspects. Fuse assembly 500 may include fuse 502 placed between an APD 504 and a ROIC input 506. Fuse assembly 500 may also include a pair of transistors 508 and 510 configured to control the voltage 512 through the fuse. As noted herein the placement of the fuse allows for noisy pixels that produce leakage current even in the disarmed state to be permanently disconnected from the corresponding ROIC channel and the biasing circuit. According to some aspects, upon assertions of the voltage 512 through fuse 502 to ground, fuse 502 will burn through creating a permanent open circuit between APD 502 and ROIC input 504, thereby permanently disabling the associated pixel. It can be appreciated that fuse 502 may be an integrated component of the ROIC or the PDA.

FIG. 6 illustrates a fuse assembly 600 according to some aspects. Fuse assembly 600 may include a fuse 602 that may be placed within the PDA (e.g., on the PDA die). In this manner, during wafer-level probing, there can be an all-electrical method of deactivating pixels. According to some aspects, fuse 602 may be installed at the cathode or anode of the APD 608 (cathode shown here). In some aspects, a pixel that is identified as leaky will be forward biased, causing it to draw enough current to blow the fuse. In some aspects, the fuse may be in-line with the APD circuitry or accessed with a separate pad such as pad 604. Similar to fuse assembly 500, when a pixel produces leakage current to be forward biased, enough current will be drawn through high voltage 606 to blow fuse 602, thereby creating an open circuit. According to some aspects, the open circuit created by the blown fuse would disconnect the APD from the DC bias and effectively disconnect the pixel producing the leakage current. It can be appreciated that a function of resistor 610 is to act as a quenching resistor as described herein. Passive quenching may be utilized in fuse assembly 600 to reduce the total avalanche current amplitude and to help protect the photodiode elements from high-current overload in the presence of very large optical input signals. It can be appreciated that the activation of fuse 602 (e.g., blowing of the fuse) may be automatically triggered by the forward bias operation of an attached pixel, and/or through operation of a control circuit (e.g., circuit 400). It can be appreciated that the control circuit may assert transistors 508 and 510 to allow a sufficiently large current from the voltage source to burn out fuse 502.

Figure 7:
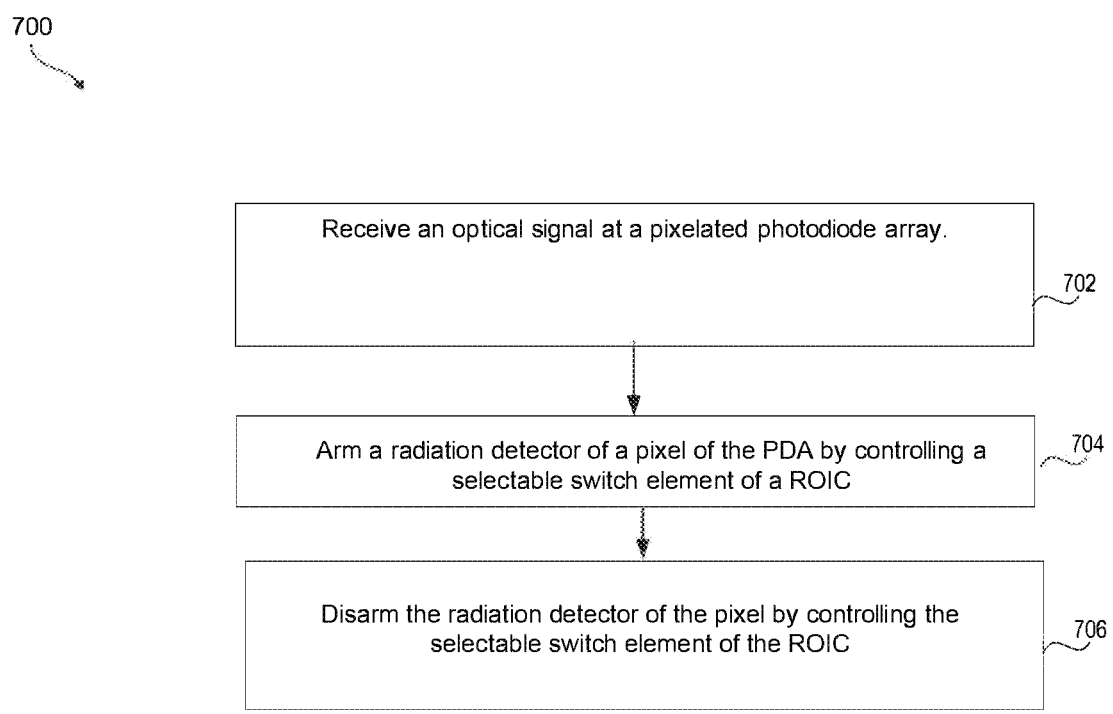
FIG. 7 illustrates an exemplary method for selectively arming/disarming non-performing pixels, in accordance with aspects of the disclosure.

FIG. 7 illustrates an exemplary process 700 for performing the switching operations described herein. According to some aspects, process 700 may include receiving an optical signal at a pixelated photodiode array (PDA), as illustrated in step 702. According to some aspects, this optical signal may be returned light reflected from a surrounding surface. According to some aspects, process 700 may further include arming a radiation detector of a pixel of the PDA by controlling a selectable switch element of a ROIC connected to the PDA, as illustrated in step 704. It can be appreciated that the arming may be performed by a logic circuit of the ROIC and that the selectable switch may transmit a received output signal of the radiation detector. According to some aspects, process 700 may further include disarming, by the logic circuit, the radiation detector of the pixel of the PDA by controlling the selectable switch element of the ROIC, the selectable switch element being configured to block the radiation detector from outputting the signal, as illustrated in step 704. It can be appreciated that the arming and disarming operations using the switch are in accordance with the operations described herein with respect to FIG. 4.

According to one example, when implemented within a sensor assembly (e.g., an FPA and/or a lidar sensor), the ROIC may be configured to detect the occurrence of an avalanche event, stops a pixel-level counter, and records the timestamp of that counter as an indication that the pixel has avalanched. The ROIC may also be configured to provide the exact time at which the pixel avalanched, which corresponds to a time-of-flight of a reflected pulse returned to that pixel. The timestamps recorded from all the pixels (including those that record a "terminal count" if they did not avalanche) are then read out to external electronics which make use of this "timestamp" data to generate a lidar point cloud using appropriate digital signal processing (DSP) firmware.

According to some aspects, the process may also include detecting a breakdown voltage of the GmAPD and placing a different selectable switch element associated with an operational radiation element in the active state by increasing a reverse voltage value to a bias level above the breakdown voltage of the GmAPD. According to some aspects, the process may also include storing a deselect mapping indicative of a faulty operation of the radiation detector and detecting the faulty operation of the radiation detector based on the deselect mapping. According to some aspects, the faulty operation of the radiation detector is associated with an observed dark current value above a predetermined dark current threshold value. The faulty operation of the radiation detector may also be associated with an observed noise level above a predetermined noise threshold value. It can be appreciated that the deselect mapping may store detector data beyond just faulty operations. As can be appreciated by those skilled in the art, the deselect mapping may store deselect metrics associated with other physical attributes of the radiation detector and/or user preferences. Such user preferences may be set for any number of reasons, including, but not limited to, testing and integration purposes.

According to some aspects, the faulty operation of the radiation detector may also be associated with an observed leakage current level above a predetermined leakage current threshold value. In this regard, the process may also include disengaging, using a circuit fuse, a radiation detector associated with the detected faulty operation in response to the observed leakage current being above the predetermined leakage current threshold. The process may also include applying a predetermined voltage to a pair of transistors within the circuit fuse to cause the fuse to burn out. It can be appreciated that the transistors are asserted to allow a sufficiently large current from a voltage source (e.g., high voltage 606 or voltage source 512) to burn out the fuse. The blown fuse creates a permanent open circuit between the PDA and the ROIC (i.e., permanently disengaging them) in response to the observed leakage current being above the predetermined leakage current threshold.

It is to be appreciated that the detailed description section, and not any other section, is intended to be used to interpret the claims. Other sections can set forth one or more but not all exemplary aspects as contemplated by the inventor(s), and thus, are not intended to limit this disclosure or the appended claims in any way.

According to aspects of the disclosure there may be disclosed an apparatus comprising a pixelated photodiode array (PDA), wherein each pixel in the PDA includes a radiation detector; and a read out integrated circuit (ROIC). According to some aspects, the ROIC may include a plurality of switch elements each being connected to a respective radiation detector of each pixel, each switch element of the plurality of switch elements being switchable between an armed state for arming its corresponding radiation detector and receiving an output signal from its corresponding detector, and a disarmed state for disarming its corresponding radiation detector and blocking the output signal, wherein in the armed state, the PDA is configured to detect an incoming optical signal and in the disarmed state, the PDA is configured to disregard the incoming optical signal, and a logic circuit configured to control a switch state of each switch element of the plurality of switch elements.

According to some aspects, the logic circuit may be further configured to arm the PDA, and place a first switch element of the plurality of switch elements associated with a first radiation detector in the disarmed state in response to detecting a faulty operation of the radiation detector.

According to some aspects, the PDA comprises one or more Geiger-mode avalanche photodiodes (GmAPDs). According to some aspects, the logic circuit is further configured to place a first switch element of the plurality of switch elements associated with a first radiation detector in the disarmed state by applying a net reverse voltage value below a detected breakdown voltage of the one or more GmAPDs. Additionally, the logic circuit may be further configured to place a second switch element of the plurality of switch elements associated with a second radiation detector in the armed state by increasing a reverse voltage value to a bias level above a detected breakdown voltage of the one or more GmAPDs, the first and second switch elements being different.

According to some aspects, the logic circuit is further configured to determine an operation status of each respective radiation detector, wherein the determined operation status corresponds to a stored select/deselect mapping for each respective radiation detector. According to some aspects, the operation status corresponds to an observed dark current value above a predetermined dark current threshold value. According to some aspects, the operation status corresponds to an observed noise level above a predetermined noise threshold value. According to some aspects, the operation status corresponds to an observed leakage current level above a predetermined leakage current threshold value.

According to some aspects, the apparatus may further comprise a circuit fuse configured to electrically disengage each respective radiation detector. According to some aspects, the circuit fuse is configured to electrically disengage each respective radiation detector in response to an operation of the radiation detector being associated with an observed leakage current above a predetermined leakage current threshold. According to some aspects, the circuit fuse is incorporated within the ROIC. It can be appreciated that the circuit fuse may comprise a pair of transistors configured to control a voltage across the circuit fuse, wherein the logic circuit is further configured to apply a predetermined voltage to the pair of transistors, the predetermined voltage causing the fuse to burn out and create a permanent open circuit between the PDA and the ROIC. According to some aspects, the logic circuit is further configured to apply the predetermined voltage in response to the observed leakage current being above the predetermined leakage current threshold.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects but should be defined only in accordance with the following claims and their equivalents.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. An apparatus comprising:
a pixelated photodiode array (PDA), wherein each pixel in the PDA includes a radiation detector;
a read out integrated circuit (ROIC) comprising:
a plurality of switch elements each being connected to a respective radiation detector of each pixel, each switch element of the plurality of switch elements being switchable between an armed state for arming its corresponding radiation detector and receiving an output signal from its corresponding detector, and a disarmed state for disarming its corresponding radiation detector and blocking the output signal, wherein in the armed state, the PDA is configured to detect an incoming optical signal and in the disarmed state, the PDA is configured to disregard the incoming optical signal, and
a logic circuit configured to control a switch state of each switch element of the plurality of switch elements; and
a circuit fuse configured to electrically disengage each respective radiation detector,
wherein the circuit fuse comprises a pair of transistors configured to control a voltage across the circuit fuse, and
wherein the logic circuit is further configured to apply a predetermined voltage to the pair of transistors, and the predetermined voltage causes the fuse to burn out and create a permanent open circuit between the PDA and the ROIC.

2. The apparatus of claim 1, wherein the logic circuit is further configured to:
arm the PDA, and
place a first switch element of the plurality of switch elements associated with a first radiation detector in the disarmed state in response to detecting a faulty operation of the radiation detector.

3. The apparatus of claim 1, wherein the PDA comprises one or more Geiger-mode avalanche photodiodes (GmAPDs).

4. The apparatus of claim 3, wherein the logic circuit is further configured to:
place a first switch element of the plurality of switch elements associated with a first radiation detector in the disarmed state by applying a net reverse voltage value below a detected breakdown voltage of the one or more GmAPDs.

5. The apparatus of claim 4, wherein the logic circuit is further configured to:
place a second switch element of the plurality of switch elements associated with a second radiation detector in the armed state by increasing a reverse voltage value to a bias level above a detected breakdown voltage of the one or more GmAPDs, the first and second switch elements being different.

6. The apparatus of claim 1, wherein the logic circuit is further configured to:
determine an operation status of each respective radiation detector, wherein the determined operation status corresponds to a stored select/deselect mapping for each respective radiation detector.

7. The apparatus of claim 6, wherein the operation status corresponds to an observed dark current value above a predetermined dark current threshold value.

8. The apparatus of claim 6, wherein the operation status corresponds to an observed noise level above a predetermined noise threshold value.

9. The apparatus of claim 6, wherein the operation status corresponds to an observed leakage current level above a predetermined leakage current threshold value.

10. The apparatus of claim 1, wherein the circuit fuse is configured to electrically disengage each respective radiation detector in response to an operation of the radiation detector being associated with an observed leakage current above a predetermined leakage current threshold.

11. The apparatus of claim 10, wherein the circuit fuse is incorporated within the ROIC.

12. The apparatus of claim 1, wherein the logic circuit is further configured to apply the predetermined voltage in response to the observed leakage current being above the predetermined leakage current threshold.

13. A method comprising:
receiving an optical signal at a pixelated photodiode array (PDA);
arming, by a logic circuit, a radiation detector of a pixel of the PDA by controlling a selectable switch element of a read out integrated circuit (ROIC) connected to the PDA to power the radiation detector and transmit a received output signal of the radiation detector; and
disarming, by the logic circuit, the radiation detector of the pixel of the PDA by controlling the selectable switch element to disconnect the radiation detector from power and to block the radiation detector from outputting the signal; and
permanently disengaging, using a circuit fuse, a radiation detector associated with a detected operation,
wherein the circuit fuse comprises a pair of transistors configured to control a voltage across the circuit fuse, and
wherein the logic circuit is further configured to apply a predetermined voltage to the pair of transistors, and the predetermined voltage causes the fuse to burn out and create a permanent open circuit between the PDA and the ROIC.

14. The method of claim 13, further comprising:
disarming the radiation detector by applying a net reverse voltage value below a detected breakdown voltage of the radiation detector.

15. The method of claim 13, further comprising:
arming the radiation detector by increasing a reverse voltage value to a bias level above the breakdown voltage of the radiation detector.

16. The method of claim 13, wherein the detected operation is a faulty operation of the radiation detector.

* * * * *